United States Patent
Park et al.

(10) Patent No.: US 10,031,293 B2
(45) Date of Patent: Jul. 24, 2018

(54) OPTICAL COUPLER

(71) Applicant: Electronics and Telecommunications Research Institute, Daejeon (KR)

(72) Inventors: Jaegyu Park, Incheon (KR); Myungjoon Kwack, Gimpo (KR); Jiho Joo, Sejong (KR); Gyungock Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/488,321

(22) Filed: Apr. 14, 2017

(65) Prior Publication Data

US 2018/0100970 A1    Apr. 12, 2018

(30) Foreign Application Priority Data

Oct. 12, 2016  (KR) .................. 10-2016-0132270

(51) Int. Cl.
G02B 6/12       (2006.01)
G02B 6/30       (2006.01)
G02B 6/122      (2006.01)
G02B 6/125      (2006.01)

(52) U.S. Cl.
CPC ............ *G02B 6/305* (2013.01); *G02B 6/125* (2013.01); *G02B 6/1228* (2013.01); *G02B 2006/12097* (2013.01); *G02B 2006/12147* (2013.01)

(58) Field of Classification Search
None
See application file for complete search history.

(56) References Cited

U.S. PATENT DOCUMENTS

| | | | |
|---|---|---|---|
| 7,643,710 B1 * | 1/2010 | Liu ................... | B82Y 20/00 385/129 |
| 9,025,920 B2 * | 5/2015 | Kim ................... | G02B 6/305 385/43 |
| 2004/0057667 A1 | 3/2004 | Yamada et al. | |
| 2010/0086256 A1 * | 4/2010 | Ben Bakir .......... | G02B 6/1228 385/49 |
| 2013/0163916 A1 | 6/2013 | Kim et al. | |
| 2013/0266263 A1 | 10/2013 | Kwon et al. | |
| 2015/0219853 A1 | 8/2015 | Kumar et al. | |
| 2016/0131842 A1 | 5/2016 | Mahgerefteh et al. | |

* cited by examiner

*Primary Examiner* — Sung Pak

(57) ABSTRACT

Provided is an optical coupler including a substrate, a buffer layer on the substrate, a ridge waveguide having a first side surface and a second side surface opposed to the first side surface, and a first waveguide disposed adjacent to the second side surface. The first waveguide includes a first body part and a first connecting part extending from one end of the first body part to be inserted in the ridge waveguide. The first connecting part has a width decreasing in the direction away from the second side surface, and the ridge waveguide includes an extension part extending under an upper surface of the buffer layer.

20 Claims, 9 Drawing Sheets

OPTICAL COUPLER

CROSS-REFERENCE TO RELATED APPLICATIONS

This U.S. non-provisional patent application claims priority under 35 U.S.C. § 119 of Korean Patent Application No. 10-2016-0132270, filed on Oct. 12, 2016, the entire contents of which are hereby incorporated by reference.

BACKGROUND

The present disclosure herein relates to an optical coupler, and more particularly, to an optical coupler including a plurality of waveguides.

As the semiconductor industry has advanced to a high level, highly integrated and high-speed semiconductor integrated circuits are demanded. However, due to various reasons, it has become difficult more and more to meet the requirements for semiconductor integrated circuits. For example, data communication through existing electric lines causes phenomena, such as skin effects and crosstalk as the size of a device is decreased. Therefore, high-speed data communication has had a limitation.

Optical coupling and optical communication using an optical device enable ultrahigh-speed data communication without such side effects. Especially, silicon-based optical devices have merits of being producible by using an existing CMOS process. Thus, optical communication using silicon-based optical devices has been spotlighted as a field which can replace the data communication using electric lines. Since the sizes of silicon-based optical devices are small, it is possible to integrate individual optical devices on a single chip. In addition, it is possible to monolithically integrate electronic devices and optical devices on a substrate.

In general, silicon-based optical devices have sizes smaller than core diameters of optical fibers. Thus, an optical coupler is required to optically couple silicon-based optical devices and optical fibers. Many researches for minimizing optical loss and enabling packaging costs to be reduced in coupling optical fibers and optical devices are being actively carried out.

SUMMARY

The present disclosure provides an optical coupler capable of minimizing optical loss.

An embodiment of the inventive concept provides an optical coupler including: a substrate; a buffer layer on the substrate; a ridge waveguide on the buffer layer, the ridge waveguide having a first side surface connected with the optical fiber; and a second side surface opposed to the first side surface; and a first waveguide on the buffer layer, the first waveguide disposed adjacent to the second side surface, wherein the first waveguide includes a first body part and a first connecting part extending from one end of the first body part to thereby be inserted in the ridge waveguide and a second connecting part extending from the other end of the first body part, wherein the first connecting part has a width decreasing in the direction away from the second side surface, and the ridge waveguide includes an extension part extending under an upper surface of the buffer layer.

In an embodiment, the buffer layer may include: a groove formed such that an upper surface thereof is recessed toward a lower surface thereof; and a protrusion part protruding toward the first side surface of the ridge waveguide, wherein the extension part may be disposed in the groove.

In an embodiment, the depth of the groove may be about 15% to about 50% of the thickness of the ridge waveguide.

In an embodiment, three side surfaces of the protrusion part may be surrounded by the extension part, and the first connecting part may be disposed on an upper surface of the protrusion part.

In an embodiment, a portion of the first body part adjacent to the first connecting part may be inserted in the ridge waveguide, and the other portion of the first body part may be exposed by the ridge waveguide.

In an embodiment, the optical coupler may further include a second waveguide disposed on the buffer layer and optically coupled to the first connecting part, wherein the second waveguide may include a second body part, and a third connecting part extending from one end of the second body part and having a width decreasing in the direction away from the second body part.

In an embodiment, a width of the second connecting part may decrease in the direction away from the first body part, wherein the first and second waveguides may be optically coupled such that one side surfaces of the second and third connecting parts contact each other.

In an embodiment, the thickness of the second waveguide may be smaller than that of the first waveguide.

In an embodiment, the width of the second connecting part may be constant, wherein the first and second waveguides may be optically coupled such that the third connecting part is inserted into the second connecting part.

In an embodiment, the first waveguide has a refractive index greater than that of the ridge waveguide and smaller than that of the second waveguide.

In an embodiment, the optical fiber may be a single-mode optical fiber.

In an embodiment of the inventive concept, an optical coupler includes a substrate, a buffer layer on the substrate, a first waveguide disposed on the buffer layer and including a first body part and first and second connecting parts respectively connected to both ends of the first body part, a ridge waveguide disposed on the buffer layer and covering the first connecting part, and a second waveguide disposed on the buffer layer adjacent to the second connecting part, wherein the second waveguide includes a second body part, and a third connecting part extending from one end of the second body part, each of the first and second connecting parts have a width decreasing in the a direction away from the first body part, the third connecting part has a width decreasing in a direction away from the second body part, and the first and second wave guides may be optically coupled such that one side surfaces of the second and third connecting parts contact each other.

In an embodiment, the ridge waveguide may include an extension part extending under an upper surface of the buffer layer.

In an embodiment, the buffer layer may include: a groove formed such that an upper surface thereof is recessed toward a lower surface thereof; and a protrusion part protruding toward the first side surface of the ridge waveguide, wherein the extension part may be disposed in the groove.

In an embodiment, the ridge waveguide may have a width decreasing in a direction toward the first waveguide.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
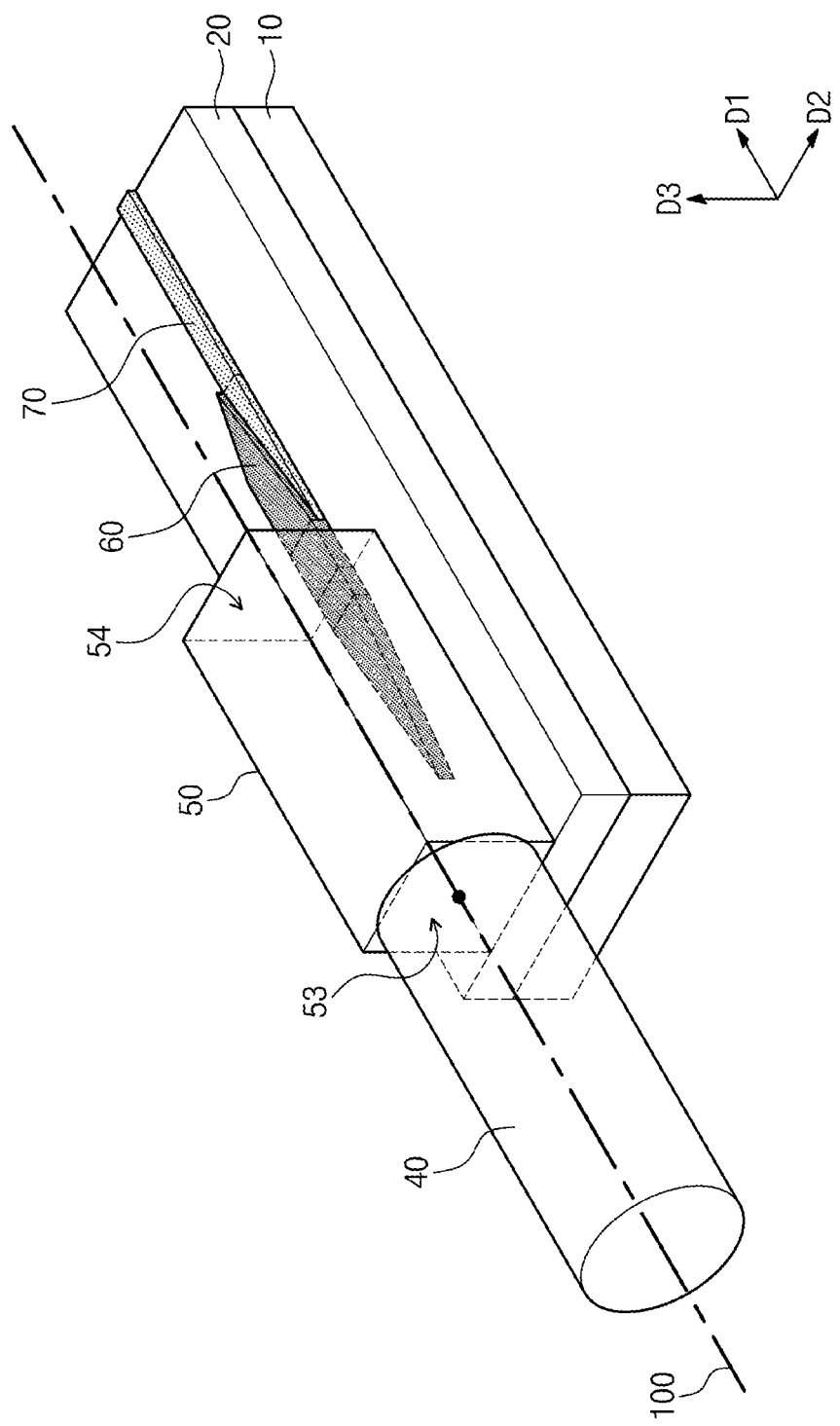
FIG. 1 is a perspective view for describing an optical coupler according to an embodiment of the inventive concept.

The objects, other objectives, features, and advantages of the inventive concept will be understood without difficulties through preferred embodiments below related to the accompanying drawings. The inventive concept may, however, be embodied in different forms and should not be construed as limited to the embodiments set forth herein. Rather, these embodiments are provided so that this disclosure will be thorough and complete, and will fully convey the scope of the present invention to those skilled in the art.

In this specification, it will also be understood that when another component is referred to as being 'on' one component, it can be directly on the one component, or an intervening third component may also be present. Also, in the figures, the thicknesses of components are exaggerated for an effective description of technical contents. In the specification, like reference numerals refer to like element throughout.

The embodiment in the detailed description will be described with sectional views and/or pan views as ideal exemplary views of the present invention. In the figures, the thicknesses of layers and regions are exaggerated for an effective description of technical contents. Accordingly, areas exemplified in the drawings have general properties, and are used to illustrate a specific shape of a semiconductor package region. Thus, this should not be construed as limited to the scope of the inventive concept. Also, though terms like a first, a second, and a third are used to describe various regions and layers in various embodiments of the inventive concept, the regions and the layers are not limited to these terms. These terms are only used to distinguish one component from another component. Embodiments described and exemplified herein include complementary embodiments thereof.

In the following description, the technical terms are used only for explaining a specific exemplary embodiment while not limiting the inventive concept. The terms of a singular form may include plural forms unless specifically mentioned. The meaning of 'comprises' and/or 'comprising' does not exclude one or more components to be present or added besides a mentioned component.

Figure 2:
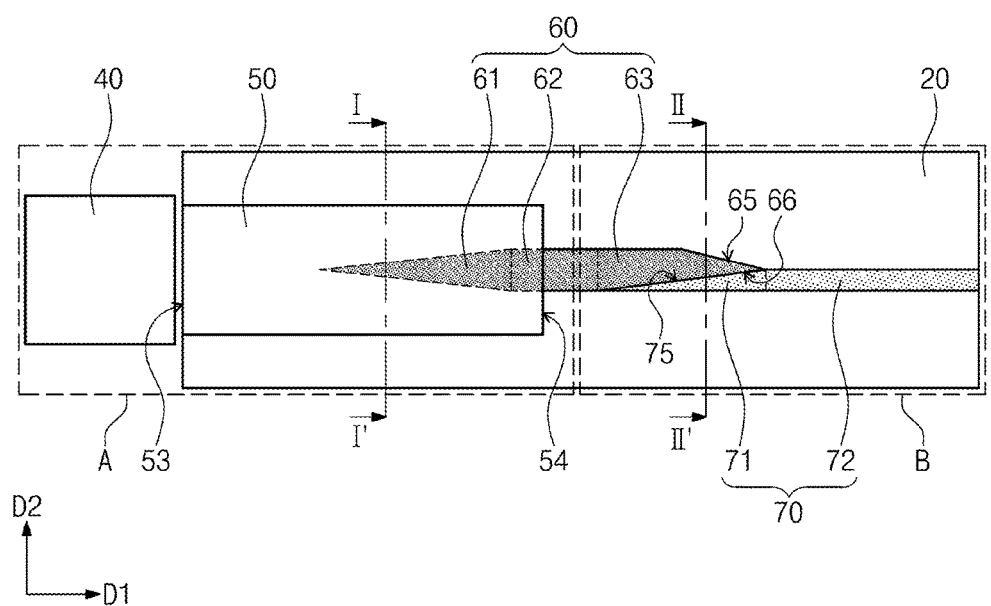
FIG. 2 is a plan view for describing the optical coupler illustrated in FIG. 1.
Figure 3A:
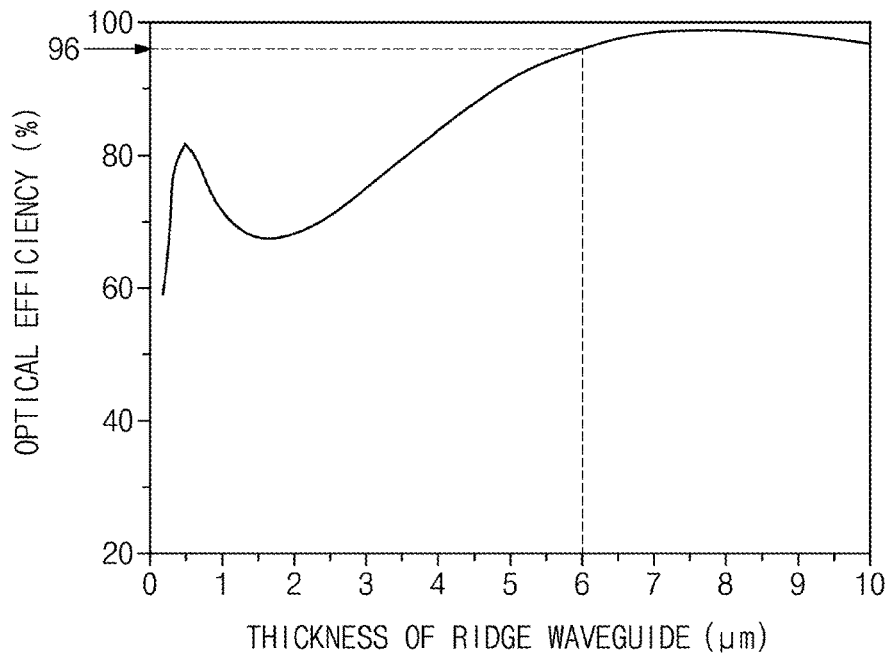
FIGS. 3A and 3B are graphs illustrating an optical coupling efficiency of a single-mode optical fiber and a ridge waveguide according to an area of a first side surface of the ridge waveguide.
Figure 3B:
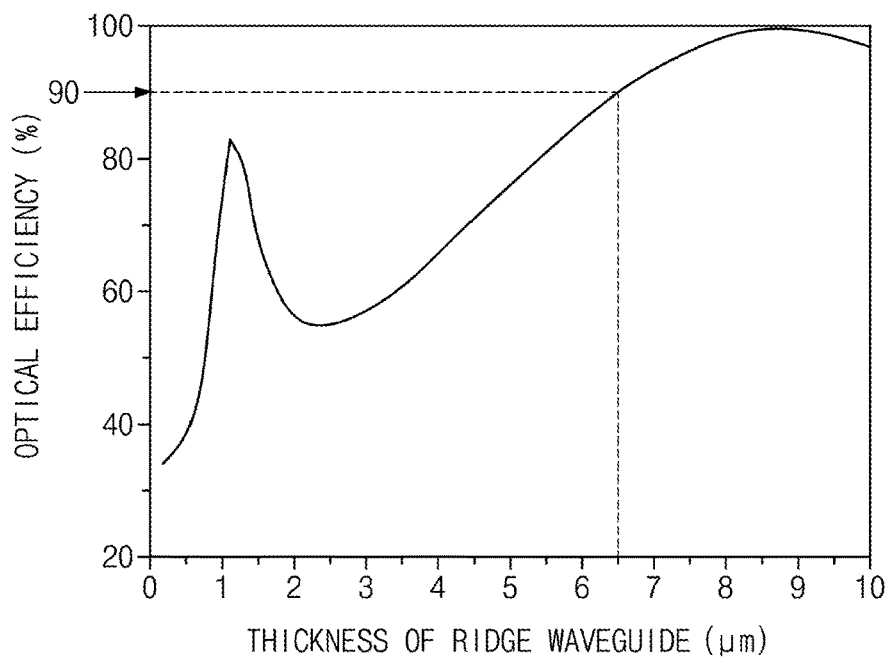
Figure 4:
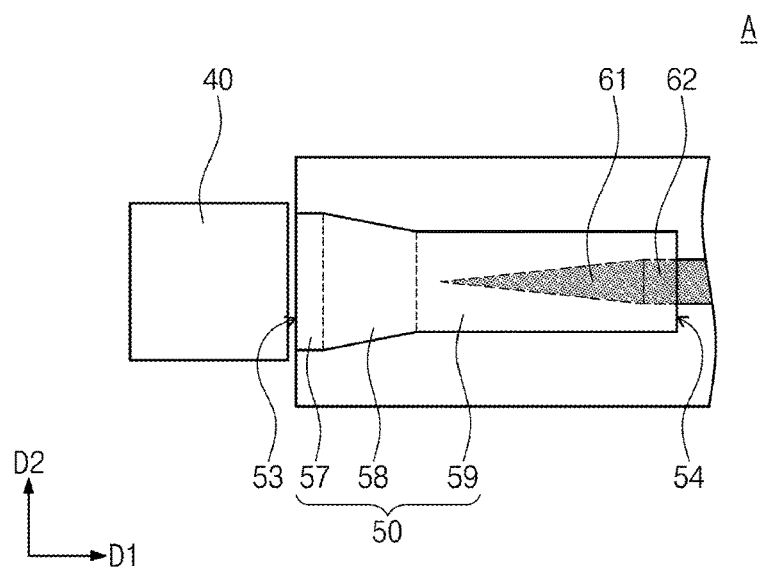
FIG. 4 is a plan view corresponding to portion A of FIG. 2.
Figure 5:
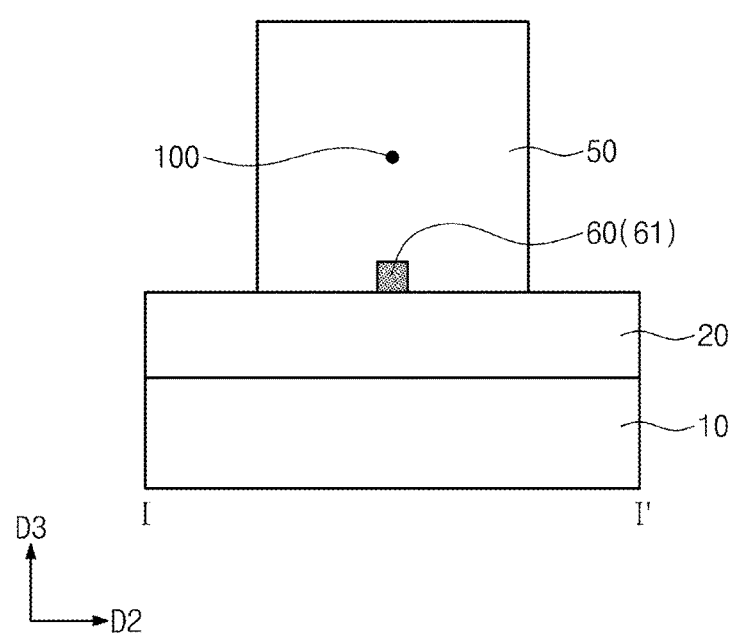
FIG. 5 is a cross-sectional view taken along line I-I' of FIG. 2.
Figure 6:
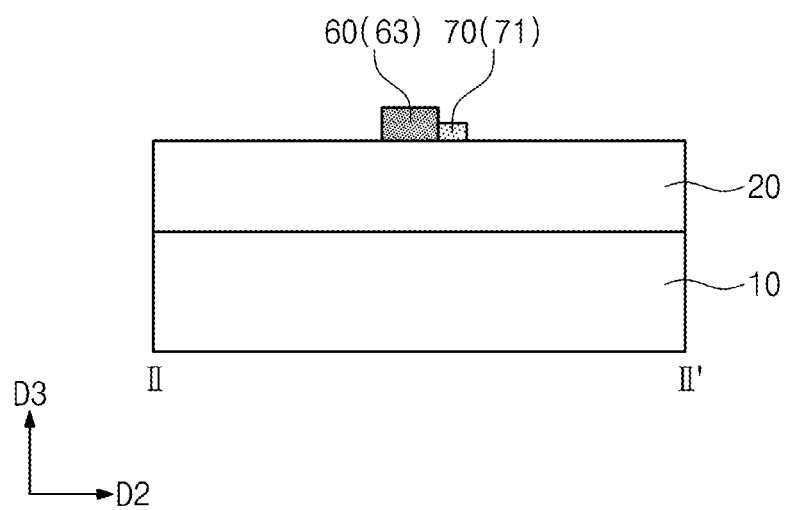
FIG. 6 is a cross-sectional view taken along line II-II' of FIG. 2.

FIG. 1 is a perspective view for describing an optical coupler according to an embodiment of the inventive concept. FIG. 2 is a plan view for describing the optical coupler illustrated in FIG. 1. FIGS. 3A and 3B are graphs illustrating an optical coupling efficiency of a single-mode optical fiber and a ridge waveguide according to an area of a first side surface of a ridge waveguide. FIG. 4 is a plan view illustrating portion A of FIG. 2. FIG. 5 is a cross-sectional view taken along line I-I' of FIG. 2. FIG. 6 is a cross-sectional view taken along line II-II' of FIG. 2.

Referring to FIGS. 1 and 2, an optical coupler according to embodiments of the inventive concept may include a substrate 10, a buffer layer 20, a ridge waveguide 50, and a first waveguide 60, and a second waveguide 70. An optical fiber 40 may be optically coupled to one side of the optical coupler. Although not shown, an optical device (not shown) may be optically coupled to the other side of the optical coupler. That is, the optical fiber, the optical coupler and the optical device may be aligned in a first direction D1. An optical signal passing through the optical fiber may be transmitted to the optical device through the optical coupler.

The substrate 10 may provide a flat surface. The substrate 10 may be a semiconductor substrate. For example, the substrate 10 may include a silicon (Si) substrate. However, the embodiments of the inventive concept are not limited thereto. The silicon (Si) substrate may have a refractive index of about 3.4.

The buffer layer 20 may be disposed on the flat surface of the substrate 10. The buffer layer 20 may have a refractive index lower than that of the substrate 10. The buffer layer 20 may include, for example, a silicon oxide ($SiO_2$) film. The silicon oxide film may have a refractive index of about 1.45.

The ridge waveguide 50 may be disposed on the buffer layer 20. Hereinafter, the terms "lengthwise direction," "widthwise direction," and "thickness direction" will be used to express three directions perpendicular to each other in an arbitrary configuration. For example, the first direction D1 may correspond to the lengthwise direction of the ridge waveguide 50, and a second direction D2 crossing the first direction D1 may correspond to the widthwise direction of the ridge waveguide 50. The first and second directions D1 and D2 may be parallel to the surface of the substrate 10. A third direction D3 perpendicular to both the first and second directions D1 and D2 may correspond to the thickness direction of the ridge waveguide 50. As illustrated in the drawings, the ridge waveguide 50 may include a first side surface 53 and a second side surface 54 which face each other in the lengthwise direction (that is, the first direction D1). The ridge waveguide 50 may include photoresist. Specifically, the ridge waveguide 50 may include SU8. SU8 may mean epoxy-based photoresist of Microchem Corp. The refractive index of SU8 may be about 1.5.

The optical fiber 40 may be disposed adjacent to the first side surface 53 of the ridge waveguide 50 to thereby be optically coupled to the ridge waveguide 50. For example, the optical fiber 40 may be optically coupled to the first side surface 53 of the ridge waveguide 50 such that the central axis thereof is aligned to the central axis 100 of the ridge waveguide 50. Although not shown, the optical fiber 40 may include a core and a clad. The refractive index of the core may be higher than that of the clad. The core may include a material which has a refractive difference of about 0.3 or less with the ridge waveguide 50. For example, the core may be silicon oxide ($SiO_2$). The refractive index of silicon oxide ($SiO_2$) may be about 1.55.

According to an embodiment, the optical fiber 40 may be a single-mode optical fiber. In the current specification, the single mode may mean that a mode of a light source traveling inside the optical fiber and/or the waveguide. The mode may mean a form in which the light source traveling inside the waveguide and/or the optical fiber has energy concentrated in a specific frequency.

Optical signals may travel through the optical fiber 40. The optical signal may be transmitted to the ridge waveguide 50 optically coupled to the optical fiber 40. In the current embodiment, the ridge waveguide 50 may satisfy a single-mode condition with respect to the optical signal transmitted through the optical fiber 40. the single-mode condition may refer to a structural characteristic of the waveguide for light incident in the waveguide to travel in the single-mode. The single-mode condition may differ according to the wavelength of the optical signal transmitted from the optical fiber 40.

According to an embodiment, the area of the first side surface 53 of the ridge waveguide 50 may satisfy a condition for having an optical coupling efficiency of 90% or more with the optical fiber 40. The optical coupling efficiency of the ridge waveguide 50 and the optical fiber 40 may differ according to the area of the first side surface 53 and the cross-sectional area of the optical fiber 40. For example, when the optical fiber 40 having a core diameter of about 10 μm and a refractive index of about 1.55 and including $SiO_2$ is coupled to the ridge waveguide 50 having a width of about 10 μm and including SU8, the optical fiber 40 may have an optical coupling efficiency illustrated in FIG. 3A as the thickness (that is, the length of the first side surface 53 in the third direction D3) of the ridge waveguide 50 varies.

The abscissa of FIG. 3A may represent the thickness of the ridge waveguide 50 or the length of the first side surface 53 in the third direction D3, and the ordinate may represent the ratio of the strength of an output optical signal to the strength of the input optical signal, that is, the optical efficiency of the ridge waveguide 50 and the optical fiber 40. For example, when optically coupled to the ridge waveguide 50 having a thickness of about 6 μm, the single-mode optical fiber 40 having a diameter of about 10 μm may have an optical coupling efficiency of about 96%.

Unlike those described above, when the first side surface 53 is a square, the optical coupling efficiency may be those as illustrated in FIG. 3B as the length of sides varies. The abscissa of FIG. 3B represents the thickness of the ridge waveguide 50, that is, the length of one side of the first side surface 53, and the ordinate represents the optical efficiency of the ridge waveguide 50 and the optical fiber 40. For example, when optically coupled to the ridge waveguide 50 having a length of one side of about 6.5 μm, the single-mode optical fiber 40 having a diameter of about 10 μm may have an optical coupling efficiency of about 90%.

According to an embodiment, as illustrated in FIG. 4, a ridge waveguide 50 may include a first straight line part 57, a mode reducing part 58, and a second straight line part 59. Specifically, the first straight line part 57 may be adjacent to a first side surface 53 of the ridge waveguide 50, and the second straight line part 59 may be adjacent to a second side surface 54. The mode reducing part 58 may be disposed between the first and second straight line parts 57 and 59. The mode reducing part 58 may have a width in the second direction D2 gradually decreasing in the direction away from the first side surface 53. That is, the mode reducing part 58 may have the maximum width at the border with the first straight line part 57 and may have the minimum width at the border with the second straight line part 59. The first straight line part 57 may have the same width as the maximum width of the mode reducing part 58, and the second straight line part 59 may have the same width as the minimum width of the mode reducing part 58.

The mode reducing part 58 may be spaced apart from the first waveguide 60. In other words, the mode reducing part 58 may not overlap the first waveguide 60. The optical signal passing through the ridge waveguide 50 may have a reduced mode size while passing through the mode reducing part 58.

Referring again to FIGS. 1 and 2, the first waveguide 60 may be disposed on the buffer layer 20 and may be adjacent to the second side surface 54 of the ridge waveguide 50. The first waveguide 60 may be optically coupled to the ridge waveguide 50 in a manner that a portion thereof is inserted in the ridge waveguide 50. Specifically, the first waveguide 60 may include a first connecting part 61, a first body part 62, and a second connecting part 63. The first connecting part 61, the first body part 62, and the second connecting part 63 may be disposed in the first direction D1 and may be connected to each other to thereby be integrated. The first connecting part 61 may be inserted in the ridge waveguide 50 by passing through the second side surface 54.

As illustrated in FIG. 5, the first connecting part 61 may be adjacent to an inner side surface of the ridge waveguide 50. For example, the first connecting part 61 may be in contact with an inner side surface of the ridge waveguide 50. That is, the upper and side surfaces of the first connecting part 61 may be surrounded by the ridge waveguide 50. In the drawings, although a portion of the first body part 62 adjacent to the first connecting part 61 is inserted in the waveguide 50, embodiments of the inventive concept are not limited thereto. According to another embodiment, the first body part 62 may not be inserted in the ridge waveguide 50.

While the thickness (that is, the length in the third direction D3) of the first waveguide 60 is constant, the width of the first waveguide 60 in the second direction D2 may vary in the lengthwise direction thereof. For example, the width of the first connecting part 61 in the second direction D2 may be gradually decreased in the direction away from the first body part 62. In other words, the width of the first connecting part 61 in the second direction D2 may be gradually decreased in the direction away from the second side surface 54 of the ridge waveguide 50. Likewise, the width of the second connecting part 63 in the second direction D2 may be gradually decreased in the direction away from the first body part 62. Conversely, the width of the first body pat 62 in the second direction D2 may be constant.

According to an embodiment, as illustrated in portion B of FIG. 2, the second connecting part 63 may have an asymmetrical planar shape. Specifically, the second connecting part 63 may include, at one end thereof, a first tapered surface 65 and a second tapered surface 66 which are connected to each other. Here, the length of a first side of the first tapered surface 65 may be smaller than that of the second side of the second tapered surface 66. For example, the length of the second side of the second tapered surface 66 may be twice the length of the first side of the first tapered surface 65. Here, the first and second sides and a third side to be described later may be parallel to the upper surface of the substrate 10, but may be inclined from a line parallel to a central axis 100 of the ridge waveguide 50.

An optical signal may be transmitted to the first waveguide 60 through the ridge waveguide 50. The first waveguide 60 may have a single-mode condition with respect to the optical signal transmitted from the ridge waveguide 50. The refractive index of the first waveguide 60 may be greater than that of the ridge waveguide 50. The first waveguide 60 may include silicon nitride ($Si_3N_4$) or silicon oxynitride ($SIO_{1-x}N_x$).

The second waveguide 70 may be disposed on the buffer layer 20 and may be adjacent to the second connecting part 63 of the first waveguide 60. The second waveguide 70 may include a second body part 72 and a third connecting part 71. The third connecting part 71 may be disposed on one side of the second body part 72. The third connecting part 71 may have a width decreasing in the direction away from the second body part 72.

The first waveguide 60 and the second waveguide 70 may be optically coupled to each other in a manner that one side surfaces thereof contact each other. For example, the third connecting part 71 may include a third tapered surface 75, and the third tapered surface 75 may contact the second tapered surface 66 of the first waveguide 60. For example, the length of a third side of the third tapered surface 75 may be equal to that of the second side of the second tapered surface 66.

According to an embodiment, as illustrated in FIG. 6, the thickness of the first waveguide 60 may be greater than that of the second waveguide 70. The refractive index of the second waveguide 70 may be greater than that of the first waveguide 60. The second waveguide 70 may include silicon (Si).

An optical signal may be transmitted to the second waveguide 70 through the first waveguide 60. The second waveguide 70 may satisfy the single-mode condition with respect to the optical signal transmitted through the first waveguide 60. Although not shown, the other side of the second body part 72 opposite third connecting part 71 may be optically coupled to an optical device (not shown).

After the first and second waveguides 60 and 70 were implemented to have the following dimensions, the optical coupling efficiency between the first and second waveguides 60 and 70 was measured. The first waveguide 60 was manufactured such that the first body part 62 had a width of about 1 μm, the first tapered surface 65 had a length of the first side of about 10 μm, and the second tapered surface 66 had a length of the second side of about 20 μm. Here, the thickness of the first waveguide was about 0.5 μm. In addition, the first waveguide 60 was manufactured by using silicon nitride ($Si_3N_4$).

The second waveguide 70 was manufactured such that the second body part 72 had a width of about 0.5 μm, and the third tapered surface had a length of the third side of 20 μm. Here, the thickness of the second waveguide was about 0.22 μm. In addition, the second waveguide 70 was manufactured by using silicon (Si).

An optical signal having a wavelength of about 1550 nm was introduced in the first waveguide 60, and then the strength of the optical signal output to the second waveguide 70 was measured. It could be understood from the measured results that the optical coupling efficiency was about 95%.

Figure 7:
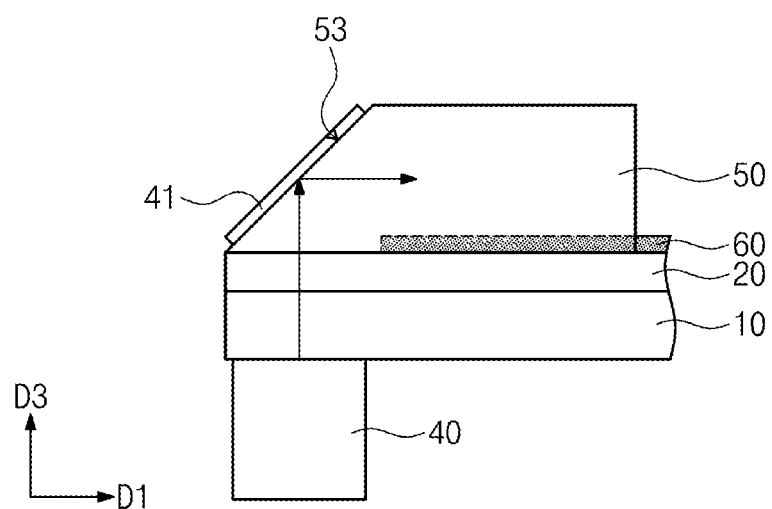
FIG. 7 is a cross-sectional view for describing an optical coupler according to another embodiment of the inventive concept and corresponds to one cross-section of portion A of FIG. 2.

FIG. 7 is a cross-sectional view for describing an optical coupler according to another embodiment of the inventive concept and corresponds to one cross-section of portion A of FIG. 2.

Referring to FIG. 7, an optical coupler may further include a reflecting member 41. Unlike those described above with reference to FIGS. 1 to 4, a first side surface 53 of a ridge waveguide 50 may be an inclined plane. The reflecting member 41 may be disposed on the first side surface 53. For example, the reflecting member 41 may include a mirror.

An optical fiber 40 may be disposed adjacent to the lower surface of a substrate 10. In the current embodiment, the substrate 10 and a buffer layer 20 may have light transmittance. In other words, the substrate 10 and a buffer layer 20 may be transparent. As illustrated in FIG. 7, an optical signal (refer to arrows) having passed through the optical fiber 40 may be reflected by the reflecting member 41 after passing through the substrate 10 and the buffer layer 20. The optical signal reflected by the reflecting member 41 may travel inside a ridge waveguide 50 in the lengthwise direction (that is, a first direction D1).

Figure 8:
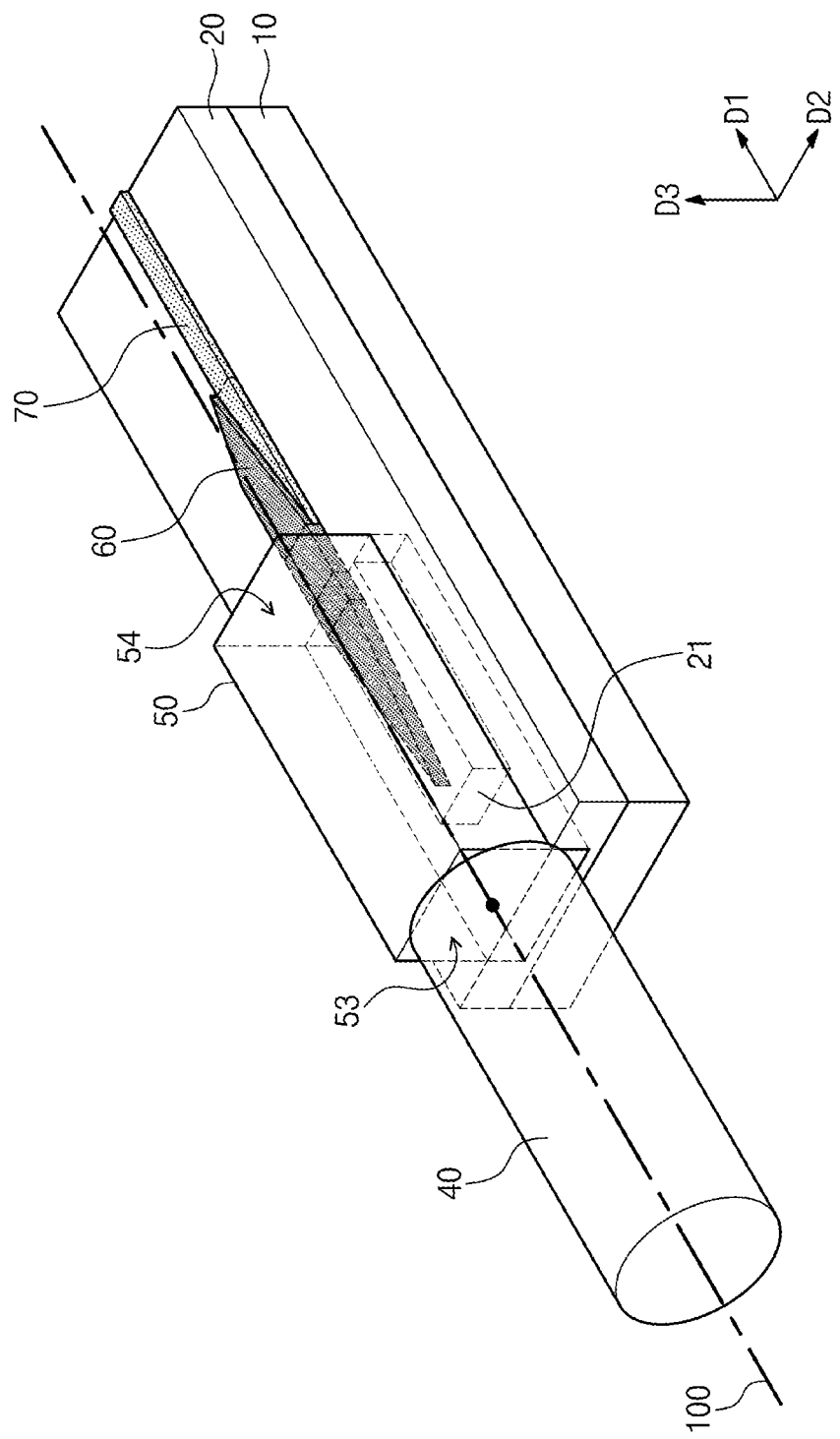
FIG. 8 is a perspective view for describing an optical coupler according to another embodiment of the inventive concept.
Figure 9:
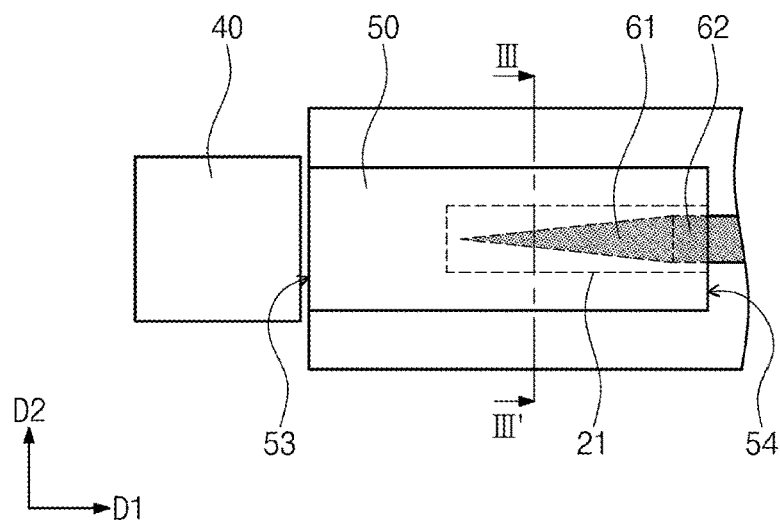
FIG. 9 is a plan view for describing the optical coupler illustrated in FIG. 8.
Figure 10:
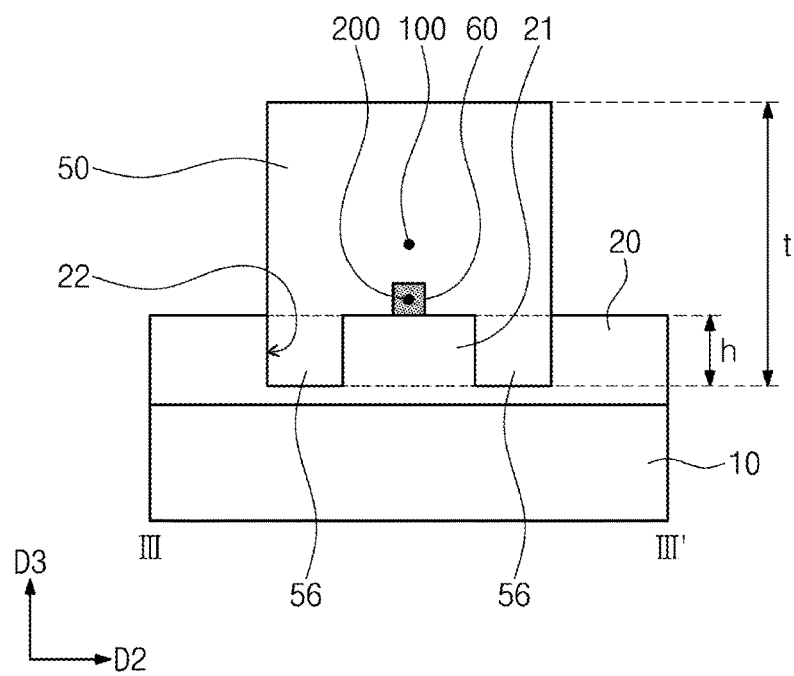
FIG. 10 is a cross-sectional view taken along line III-III' of FIG. 9.

FIG. 8 is a perspective view for describing an optical coupler paper according to another embodiment of the inventive concept. FIG. 9 is a plan view for describing the optical coupler illustrated in FIG. 8. FIG. 10 is a cross-sectional view taken along line III-III' of FIG. 9.

Referring to FIGS. 8 to 10, a ridge waveguide 50 may include an extension part 56 extending under the upper surface of a buffer layer 20. Specifically, the buffer layer 20 may include a groove 22 formed such that the upper surface thereof is recessed toward the lower surface thereof and a protrusion part 21 protruding in the reverse direction to the first direction D1 from the inner side surface of the groove 22. The extension part 56 of the ridge waveguide 50 may be provided in the groove 22 of the buffer layer 20. Three protrusion parts 21 of the protrusion part exposed to the groove 22 of the buffer layer 20 may be surrounded by the extension part 56 of the ridge waveguide 50. The upper surface of the protrusion part 21 may provide a flat surface. The lower surface of the extension part 56 of the ridge waveguide 50 may contact the bottom surface of the groove 22 of the buffer layer 20.

As described above with reference to FIGS. 1 and 2, a first waveguide 60 may be optically coupled to the ridge waveguide 50 by being inserted into the ridge waveguide 50. In the current embodiment, a first connecting part 61 of the first waveguide 60 may be disposed on the protrusion part 21 of the buffer layer 20. The upper and side surfaces of the first connecting part 61 may be surrounded by the ridge waveguide 50. As the ridge waveguide 50 extends under the upper surface of the buffer layer 20, a central axis 100 passing through the center of a first side surface 53 may be close to the central axis 200 of the first waveguide 60. The closer the central axis 100 of the ride waveguide 50 to the central axis 200 of the first waveguide 60, the greater the optical coupling efficiency, because the overlap of a mode becomes stronger.

Specifically, the optical coupling efficiency of the ridge waveguide 50 and the first waveguide 60 may vary according to the recessed depth of the groove 22 (in other words, the length h of the extension part 56). The length h of the extension part 56 may be implemented to have a size of about 15% to about 50% of the thickness t of the ridge waveguide 50, and in this case, the optical coupling efficiency of the ridge waveguide 50 and the first waveguide 60 may be optimized. Other configurations are the same as or similar to those described with respect to FIGS. 1 and 2, and therefore, the detailed description thereof will not be provided.

After the ridge waveguide 50 and the first waveguides 60 were implemented to have the following dimensions, the optical coupling efficiency between the ridge waveguide 50 and the first waveguides 60 was measured. The ridge waveguide 50 was manufactured such that the first side surface 53 had width and thickness of about 9 μm and the extension part 56 had a length h of about 2 μm. The ridge waveguide 50 was manufactured by using SU8.

The first waveguide 60 was manufactured such that the first connecting part 61 had a length of about 640 μm. The first waveguide 60 was manufactured by using silicon nitride ($Si_3N_4$). An optical signal having a wavelength of about 1550 nm was introduced in the first waveguide 60 through the ridge waveguide 50, and then the strength of the optical signal output to the second waveguide 60 was measured. It could be understood from the measured results that the optical coupling efficiency was about 95%.

Figure 11:
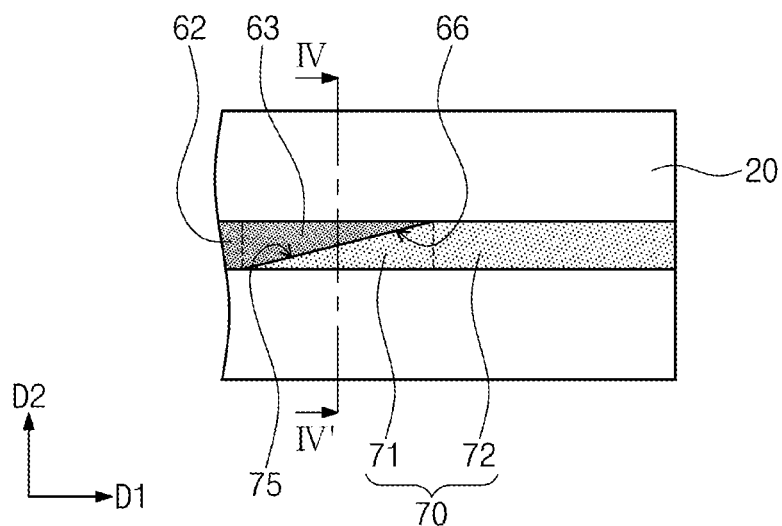
FIG. 11 is a plan view of portion B of FIG. 2 according to another embodiment.
Figure 12:
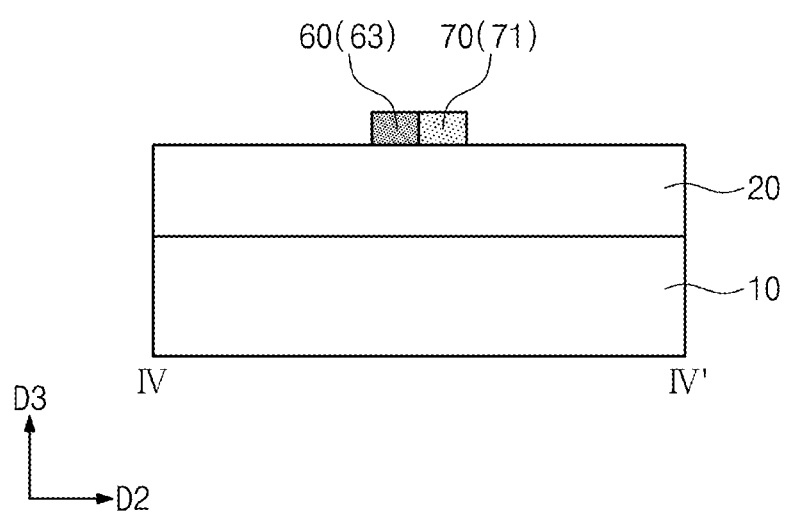
FIG. 12 is a cross-sectional view taken along line IV-IV' of FIG. 11.

FIG. 11 is a plan view of portion B of FIG. 2 according to another embodiment. FIG. 12 is a cross-sectional view taken along line IV-IV' of FIG. 11.

According to an embodiment, as illustrated in FIG. 11, one side of a second connecting part 63 may be aligned in a first direction D1 together with one side of a first body part 62. The second connecting part 63 may include a second tapered surface 66 at the other side thereof. The other side of the second connecting part 63 may be inclined from a line parallel to the first direction D1. Unlike those described above with reference to FIGS. 1 and 2, the second connecting part 63 of a first waveguide 60 may not include a first tapered surface 65.

A third connecting part 71 of a second waveguide 70 may include a third tapered surface 75. The third tapered surface 75 may contact the second tapered surface 66 of the first waveguide 60. For example, the length of a third side of the third tapered surface 75 may be equal to that of the second side of the second tapered surface 66.

In the current embodiment, the width of the first waveguide 60 may be equal to that of the second waveguide 70. Also, as illustrated in FIG. 12, the thickness of the first waveguide 60 may be equal to that of the second waveguide 70.

Figure 13:
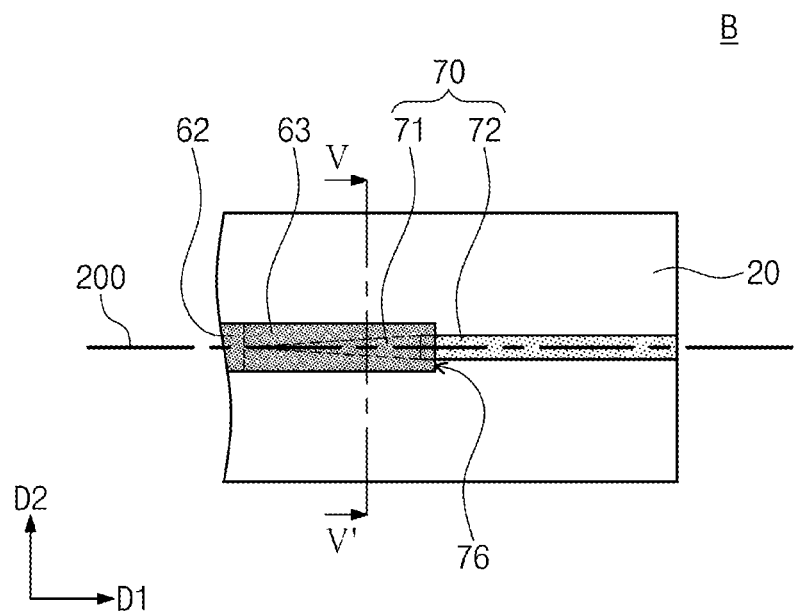
FIG. 13 is a plan view of portion B of FIG. 2 according to another embodiment.
Figure 14:
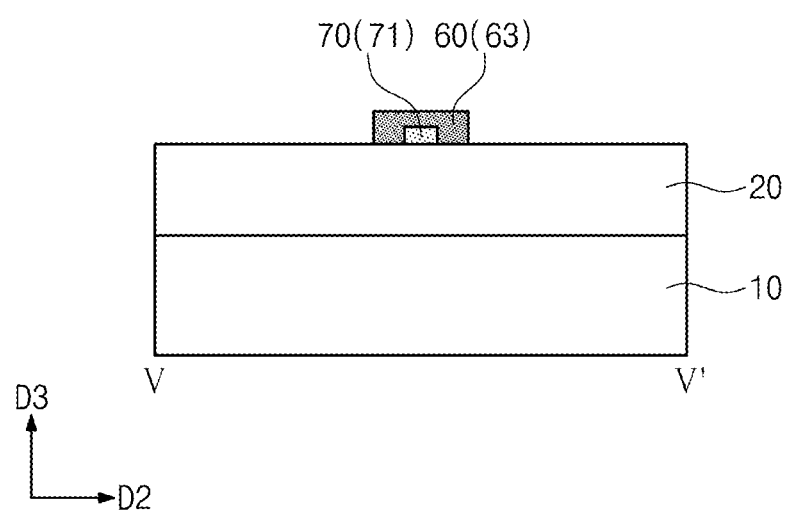
FIG. 14 is a cross-sectional view taken along line V-V' of FIG. 13.

FIG. 13 is a plan view of portion B of FIG. 2 according to another embodiment. FIG. 14 is a cross-sectional view taken along line V-V' of FIG. 13.

Referring to FIGS. 13 and 14, unlike those described with reference to FIGS. 1, 2, 11, and 12, a second waveguide 70 may be optically coupled to a first waveguide 60 by being inserted into the first wave guide 60. Specifically, a second connecting part 63 of the first waveguide 60 may have the same width as that of the first body part 62. That is, the width of the second connecting pat 63 in a second direction D2 may be constant. Accordingly, the second connecting part 63 may include a third side surface 76 parallel to a surface formed by the second direction D2 and a third direction D3. A third connecting part 71 of the second waveguide 70 may be inserted into the second connecting part 63 of the first waveguide 60 through the third side surface 76. A portion of a second body part 72 adjacent to the third connecting part 71 may also be inserted in the first waveguide 60, but embodiments of the inventive concept are not limited thereto. Another portion of the second body part 72 may be exposed by the first waveguide 60.

The third connecting part 71 may have a line width decreasing in the direction away from the second body part 72. In other words, the width of the third connecting part 71 may be gradually decreased in the direction away from the third side surface 76 of the first waveguide 60. The tip of the third connecting part 71 may be positioned on the central axis 200 of the first waveguide 60. As illustrated in FIG. 14, the third connecting part 71 may be adjacent to or contact inner side surfaces of the first waveguide 60. That is, the third connecting part 71 may be surrounded by the first waveguide 60. The thickness of the third connecting part 71 may be constant. An optical signal passing through the first waveguide 60 may be transmitted to the second waveguide 70. The second waveguide 70 may satisfy a single-mode condition with respect to the optical signal transmitted through the first waveguide 60.

After the first and second waveguides 60 and 70 were implemented to have the following dimensions, the optical coupling efficiency between the first and second waveguides 60 and 70 was measured.

The first waveguide 60 was manufactured such that the length of the first body part 62 had a length of about 1 μm.

Here, the thickness of the first waveguide 60 was about 0.5 μm. In addition, the first waveguide 60 was manufactured by using silicon nitride ($Si_3N_4$).

The second waveguide 70 was manufactured such that the second body part 72 has a width of about 0.5 μm, and the third connecting part 71 has a length of about 20 μm. Here, the thickness of the second waveguide 70 was about 0.22 μm. In addition, the second waveguide 70 was manufactured by using silicon (Si).

An optical signal having a wavelength of about 1550 nm was introduced in the second waveguide 70, and then the strength of the optical signal output to the second waveguide 70 was measured. It could be understood from the measured results that the optical coupling efficiency was about 95%.

An optical coupler according to an embodiment has a structure in which a plurality of waveguides are optically coupled. One end of the optical coupler may be optically coupled to an optical fiber, and the other end of the optical coupler may be optically coupled to an optical device. An optical signal transmitted to the optical coupler has a reduced mode while passing through the plurality of waveguides, and may thereby be easily transmitted to the optical device having a smaller cross-sectional area than that of the optical fiber.

The plurality of waveguides having refractive indexes in the order of a second waveguide, a first waveguide, and a ridge waveguide may alleviate the difference in refractive indexes in the optical coupling of the optical fiber and a photonics device. That is, the loss of the optical signal caused by the abrupt difference in the refractive indexes of media may be prevented. Consequently, according to embodiments of the inventive concept, an optical coupler capable of enhancing an optical coupling efficiency between the optical fiber and the optical devices may be provided.

An optical coupler according to an embodiment has a structure in which a plurality of waveguides are optically coupled. One end of the optical coupler may be optically coupled to an optical fiber, and the other end of the optical coupler may be optically coupled to an optical device. The optical signal transmitted from the optical fiber to the optical coupler has a mode size reduced while passing through the plurality of waveguides, and thus may be easily transmitted to the optical device having a smaller cross-sectional area than that of the optical fiber.

The plurality of waveguides having refractive indexes in the order of a second waveguide, a first waveguide, and a ridge waveguide may alleviate the difference in refractive indexes in the optical coupling of the optical fiber and a photonics device. That is, the loss of the optical signal caused by the abrupt difference in the refractive indexes of media may be prevented. Consequently, according to embodiments of the inventive concept, an optical coupler capable of enhancing an optical coupling efficiency between the optical fiber and the optical devices may be provided.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description. Therefore, the above-described embodiments are illustrative in all the aspects, and should be construed as not being limitative.

What is claimed is:

1. An optical coupler configured to connect an optical device and an optical fiber, the optical coupler comprising:
   a substrate;
   a buffer layer on the substrate;
   a ridge waveguide on the buffer layer, the ridge waveguide having a first side surface connected with the optical fiber and a second side surface opposed to the first side surface, the first side surface having a greater width than the second side surface; and
   a first waveguide on the buffer layer, the first waveguide disposed adjacent to the second side surface,
   wherein the first waveguide includes a first body part and a first connecting part extending from one end of the first body part to thereby be inserted in the ridge waveguide,
   wherein the first connecting part has a width decreasing in a direction away from the second side surface, and
   wherein the ridge waveguide includes an extension part extending under an upper surface of the buffer layer.

2. The optical coupler of claim 1, wherein the buffer layer comprises:
   a groove formed such that an upper surface thereof is recessed toward a lower surface thereof; and
   a protrusion part protruding toward the first side surface of the ridge waveguide, wherein the extension part is disposed in the groove.

3. The optical coupler of claim 2, wherein the depth of the groove is about 15% to about 50% of the thickness of the ridge waveguide.

4. The optical coupler of claim 2, wherein three side surfaces of the protrusion part are surrounded by the extension part, and the first connecting part is disposed on an upper surface of the protrusion part.

5. The optical coupler of claim 1, wherein a portion of the first body part adjacent to the first connecting part is inserted in the ridge waveguide, and the other portion of the first body part is exposed by the ridge waveguide.

6. The optical coupler of claim 1, wherein the ridge waveguide has a refractive index smaller than that of the first waveguide.

7. The optical coupler of claim 1, wherein the optical fiber is a single-mode optical fiber.

8. The optical coupler of claim 1, further comprising a second waveguide on the buffer layer and optically coupled to the first waveguide, wherein the second waveguide includes:
   a second body part, and
   a third connecting part extending from one end of the second body part and having a width decreasing in the direction away from the second body part,
   wherein the first waveguide further comprises a second connecting part extending from the other end of the first body part, and
   wherein the third connecting part is connected to the second connecting part.

9. The optical coupler of claim 8, wherein the width of the second connecting part decreases in the direction away from the first body part, wherein
   the first and second waveguides are optically coupled such that one side surfaces of the second and third connecting parts contact each other.

10. The optical coupler of claim 9, wherein a thickness of the second waveguide is smaller than that of the first waveguide.

11. The optical coupler of claim 8, wherein a width of the second connecting part is constant, wherein the first and second waveguides are optically coupled such that the third connecting part is inserted into the second connecting part.

12. The optical coupler of claim 8, wherein the first waveguide has a refractive index smaller than that of the second waveguide.

13. The optical coupler of claim 1, wherein the ridge waveguide includes:
   a first straight line part having the first side surface;
   a second straight line part having the second side surface; and
   a mode reducing part disposed between the first straight line part and the second straight line part, a width of the mode reducing part decreasing along a direction from the first straight line part to the second straight line part.

14. The optical coupler of claim 13, wherein the mode reducing part has a maximum width at a border with the first straight line part, and has a minimum width at a border with the second straight line part.

15. The optical coupler of claim 14, wherein the mode reducing part is spaced apart from the first waveguide.

16. An optical coupler configured to connect an optical device and an optical fiber, the optical coupler comprising:
   a substrate;
   a buffer layer on the substrate;
   a ridge waveguide on the buffer layer, the ridge waveguide having a first side surface connected with the optical fiber and a second side surface opposed to the first side surface;
   a first waveguide on the buffer layer, the first waveguide disposed adjacent to the second side surface; and
   a second waveguide on the buffer layer and optically coupled to the first waveguide,
   wherein the first waveguide includes a first body part, a first connecting part, and a second connection part, the first connecting part extending from one end of the first body part to thereby be inserted in the ridge waveguide, the second connecting part extending from the other end of the first body part,
   wherein the first connecting part has a width decreasing in a direction away from the second side surface,
   wherein the ridge waveguide includes an extension part extending under an upper surface of the buffer layer,
   wherein the second waveguide includes:
   a second body part, and
   a third connecting part extending from one end of the second body part and having a width decreasing in a direction away from the second body part, and wherein the third connecting part is connected to the second connecting part.

17. The optical coupler of claim 16, wherein a width of the second connecting part decreases in a direction away from the first body part, wherein the first and second waveguides are optically coupled such that one side surfaces of the second and third connecting parts contact each other.

18. The optical coupler of claim 17, wherein a thickness of the second waveguide is smaller than that of the first waveguide.

19. The optical coupler of claim 16, wherein a width of the second connecting part is constant, wherein the first and second waveguides are optically coupled such that the third connecting part is inserted into the second connecting part.

20. The optical coupler of claim 16, wherein the first waveguide has a refractive index smaller than that of the second waveguide.

* * * * *